(12) United States Patent
Guo et al.

(10) Patent No.: US 9,557,441 B2
(45) Date of Patent: Jan. 31, 2017

(54) GAIN STABILIZATION IN A GAMMA RAY DETECTION APPARATUS

(71) Applicant: Halliburton Energy Services, Inc., Houston, TX (US)

(72) Inventors: Weijun Guo, Houston, TX (US); Da Luo, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/889,273

(22) PCT Filed: Dec. 5, 2014

(86) PCT No.: PCT/US2014/068721
§ 371 (c)(1),
(2) Date: Nov. 5, 2015

(87) PCT Pub. No.: WO2016/089415
PCT Pub. Date: Jun. 9, 2016

(65) Prior Publication Data
US 2016/0349404 A1    Dec. 1, 2016

(51) Int. Cl.
*G01T 1/20* (2006.01)
*G01V 13/00* (2006.01)
(Continued)

(52) U.S. Cl.
CPC ............... *G01V 13/00* (2013.01); *G01T 1/202* (2013.01); *G01T 1/2018* (2013.01); *G01V 5/04* (2013.01)

(58) Field of Classification Search
CPC ....... G01T 1/2018; G01T 1/202; G01V 13/00; G01V 5/04
See application file for complete search history.

(56) References Cited

U.S. PATENT DOCUMENTS

| | | |
|---|---|---|
| 4,053,767 A | 10/1977 | Kampfer et al. |
| 5,360,975 A | 11/1994 | Stoller |

(Continued)

FOREIGN PATENT DOCUMENTS

| | | |
|---|---|---|
| EP | 0125024 A1 | 11/1984 |
| WO | WO-2016/089415 A1 | 6/2016 |

OTHER PUBLICATIONS

"International Application Serial No. PCT/US2014/068721, International Search Report mailed Aug. 19, 2015", 4 pgs.

(Continued)

*Primary Examiner* — Mark R Gaworecki

(57) ABSTRACT

In some embodiments, an apparatus and a system, as well as a method and an article, may operate to receive gamma ray measurements from a gamma ray detector; to generate a spectrum based on the gamma ray measurements, the spectrum including channels and count rates for the channels, wherein a channel number of a channel corresponds to energy values associated with the gamma ray measurements; to generate a ratio of total counts in a first window of the spectrum to total counts in a second window of the spectrum, the first window including a first set of channels starting at a low threshold channel and the second window including a second set of channels; and to adjust a gain of the gamma ray detector responsive to a determination that the ratio is different from a desired ratio. Additional apparatus, systems, and methods are disclosed.

20 Claims, 7 Drawing Sheets

(51) Int. Cl.
    *G01V 5/04*        (2006.01)
    *G01T 1/202*       (2006.01)

(56)         References Cited

U.S. PATENT DOCUMENTS 5,600,135 A      2/1997   Jacobson
    5,635,712 A      6/1997   Scott, III et al.
    2006/0065824 A1  3/2006   Mickael
    2008/0265151 A1* 10/2008  Gadot .................... G01V 5/04
                                                          250/261
    2010/0116978 A1  5/2010   Stoller et al.
    2010/0243877 A1  9/2010   Berheide et al.

OTHER PUBLICATIONS

"International Application Serial No. PCT/US2014/068721, Written Opinion mailed Aug. 19, 2015", 4 pgs.

* cited by examiner

GAIN STABILIZATION IN A GAMMA RAY DETECTION APPARATUS

PRIORITY APPLICATION

This application is a U.S. National Stage Filing under 35 U.S.C. §371 from International Application No. PCT/US2014/068721, filed 5 Dec. 2014; which application is incorporated herein by reference in its entirety.

BACKGROUND

Understanding the structure and properties of geological formations can reduce the cost of drilling wells for oil and gas exploration. Measurements made in a borehole (i.e., downhole measurements) are typically performed to attain this understanding, to identify the composition and distribution of material that surrounds the measurement device downhole. To obtain such measurements, gamma ray detectors are often used to measure naturally-occurring gamma radiation downhole. However, the gain of some gamma ray detectors may fluctuate due to environmental conditions downhole. These fluctuations can cause changes in the apparent energy level detected by the gamma ray detector, thereby leading to inaccuracies in the measurements reported by gamma ray measurement tools.

DETAILED DESCRIPTION

To address some of the challenges described above, as well as others, apparatus, systems, and methods are described herein for stabilizing net gain of gamma ray detectors.

Figure 1:
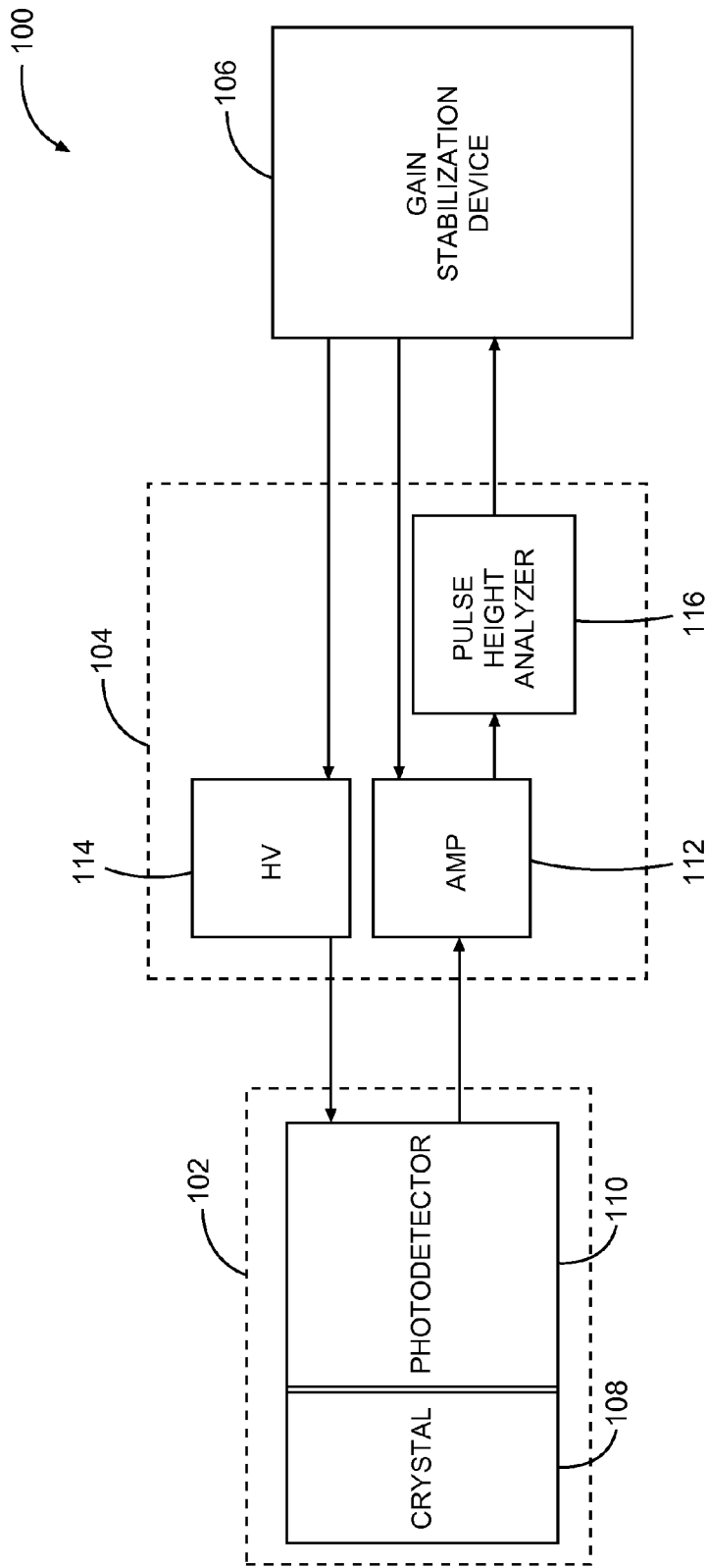
FIG. 1 depicts a schematic diagram of a gamma ray measurement tool in accordance with some embodiments.

FIG. 1 depicts a schematic diagram of a gamma ray measurement tool 100 in accordance with some embodiments. The gamma ray measurement tool 100 includes a downhole gamma ray detector 102, signal processing circuitry 104, and a gain stabilization device 106. The gamma ray detector 102 detects the natural gamma radiation. The gamma ray detector 102 can include a Scinturion gamma module, available from General Electric of Fairfield, Conn., for example, or other gamma ray detectors utilizing sodium-iodine (NaI)-based scintillation crystals, although embodiments are not limited thereto. This natural gamma radiation is radiated by elements including potassium, uranium, and thorium such as are commonly present in subterranean formation environments, although embodiments are not limited to detecting radiation emitted from any particular element. The gamma ray detector 102 may be part of a drilling assembly, for logging while drilling (LWD), or measuring while drilling (MWD) operations, or may be a wireline tool for logging an existing well as described later herein with reference to FIGS. 6 and 7. The gamma ray measurement tool 100 can include a plurality of azimuthal gamma ray detectors.

Each gamma ray detector 102 counts gamma ray energy emitted naturally subsurface, but could also be used for other sources of gamma rays in the wellbore. The azimuthal gamma ray detectors may be near an exterior of a logging tool and be spaced about a circumference of the logging tool. While a plurality of gamma ray detectors may be included, only one is explicitly presented here.

The gamma ray detector 102 provides signals that scale with the energy deposited by the gamma rays in the gamma ray detector 102. The gamma ray detector 102 includes one or more scintillation crystals 108 to scintillate responsive to radiation emitted by a subterranean formation environment, and an optically-coupled photodetector 110, e.g., a photomultiplier tube, for transmitting light emitted by the scintillation crystals 108. The gamma ray detector 102 will preferably not include a reference scintillation crystal. The gamma ray detector 102 is electrically coupled to signal processing circuitry 104. The signal processing circuitry 104 may include an amplifier 112, a variable high voltage supply unit 114, and pulse height analyzer 116.

The gamma ray detector receives a supply voltage from the high voltage supply unit 114. One high voltage supply unit 114 may be used to power multiple gamma ray detectors. The high voltage supply unit 114 may be configured so that the output voltage can be adjusted by an external gain stabilization device 106. The high voltage supply unit 114 may be capable of providing an output voltage in a range of about 500-5000 volts. The high voltage supply unit 114 can include an ORTEC Model 456 or Model 556 high voltage power supply, available from AMETEK, Inc. of Berwyn, Pa., although embodiments are not limited thereto.

The signal processing circuitry 104 also includes one or more amplifiers 112 to modify (e.g., amplify) the amplitude of the signals such as electrical impulses output by the photodetector 110. The amplifier 112 can be adjusted by the gain stabilization device 106. The signal processing circuitry 104 further includes the pulse height analyzer 116 to receive signals representative of gamma ray measurements from the gamma ray detector 102. The pulse height analyzer 116 will generate at least one spectrum based on the gamma ray measurements, and the pulse height analyzer 116 will provide this multi-channel spectrum to the gain stabilization device 106. The pulse height analyzer 116 can include an ORTEC® EASY-NIM 928 combination MCB/quad counter/dual timer module, available from AMETEK, Inc. of Berwyn, Pa., although embodiments are not limited thereto. The gain stabilization device 106 controls the output voltage of the high voltage supply unit 114 or the output of the amplifier 112 to adjust gain of the gamma ray detector 102.

In various embodiments, whether accomplished on a wireline (FIG. 6) or in logging while drilling (FIG. 7), the gain stabilization device 106 receives the multi-channel spectrum from the pulse height analyzer 116 and records the spectrum across a spectrum of n channels (where n equals the number of channels). Each channel represents a range of energy levels, wherein the energy levels can be measured in units such as kilo electron volts (keV). The number of channels n may vary for different applications; for example, n may be 10, 16, 20, 50, 64, 100, 128, 150, 200, 256, 400 or more, or any number in between. In some embodiments, the range of channel numbers corresponds to energy values of 200 keV to 900 keV, although embodiments are not limited thereto. The range of channel numbers may be set based on criteria such as electrical parameters of the gamma ray detector 102. The gain stabilization device 106 develops "counts" over a number of channels, where counts refer to the number of times gamma ray energy with the corresponding energy level is detected by the gamma ray detector 102.

The gamma ray measurement tool 100 can be a gross counting gamma ray detector, wherein the process of determining the gross count involves developing counts over a plurality of channels arranged in a spectrum. The gain of the gamma ray detector 102 varies at times with certain variables, e.g., temperature, equipment limitations, high voltage of the photodetector 110 in the gamma ray detector 102, etc. These variations will affect the counts stored in the various channels, leading to inaccurate measurement reports being reported by the gamma ray measurement tool 100. To obtain a gross count that is not affected by these variations, the gain stabilization device 106 stabilizes the gain of the gamma ray detector 102 by calculating the ratio of total counts within two windows of the spectrum, and adjusting the gamma ray detector 102 gains until this ratio equals a desired ratio, according to methods described herein with respect to various embodiments.

Figure 2:
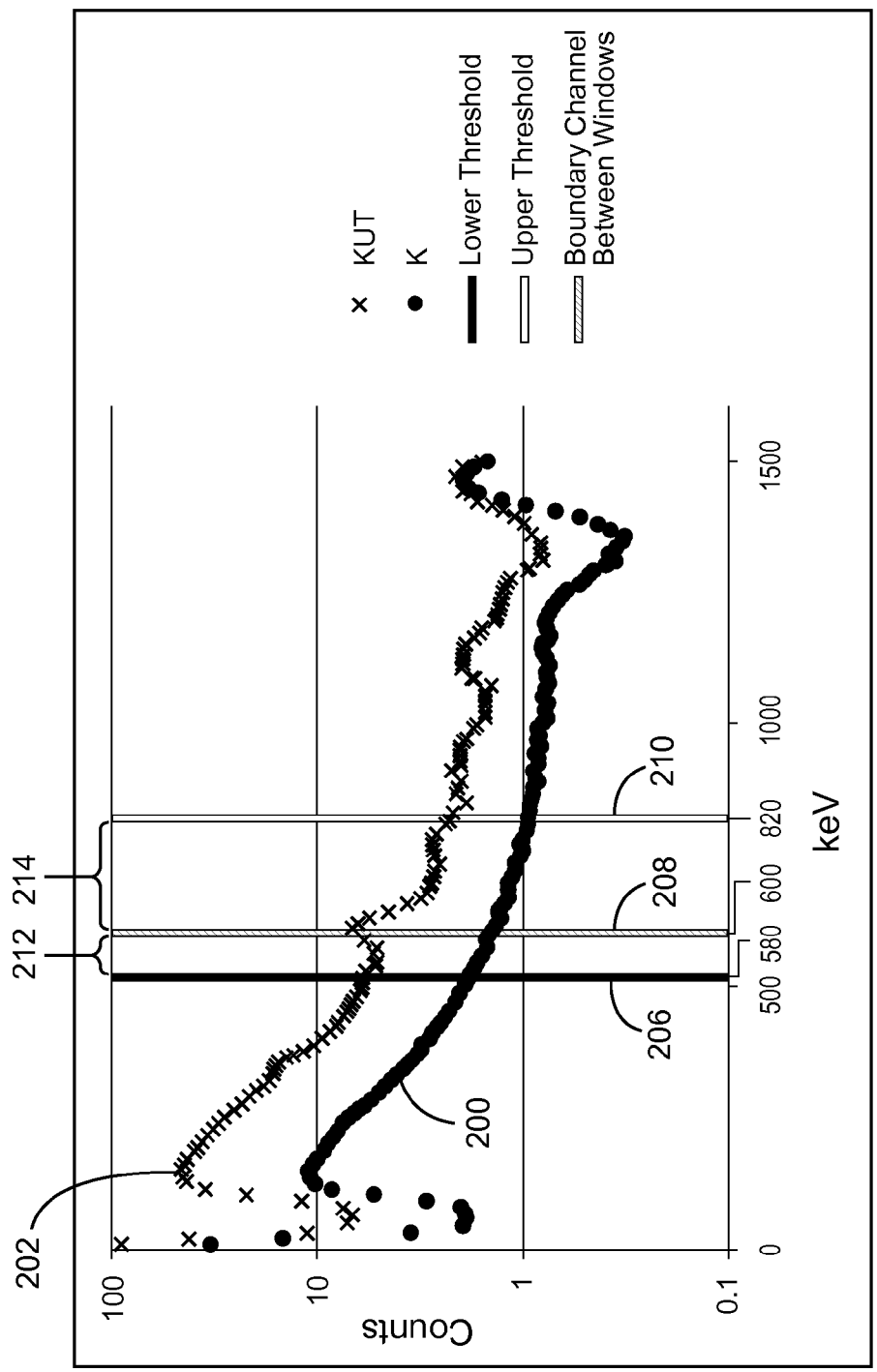
FIG. 2 depicts example gamma spectra in two different formation environments with windows indicated in accordance with some embodiments.

FIG. 2 depicts example gamma spectra 200, 202 in two different formation environments with windows 212, 214 indicated in accordance with some embodiments. The spectrum 200 is an example spectrum for a formation environment consisting essentially of potassium. As will be understood by those of ordinary skill in the art, this type of formation environment is useful as a reference, but may not occur commonly in the field. Most, if not all, formation environments will include at least some potassium due to the presence of high-potassium drilling fluids that have been placed downhole in drilling and exploration operations. A potassium spectrum such as spectrum 200 may be generated as a reference because the count values can be known beforehand, will not typically vary based on gamma ray detector 102 gain, and can act as a limiting spectrum beyond which naturally occurring gamma radiation will typically not be observed.

The spectrum 202 is an example gamma spectrum such as can be generated by a pulse height analyzer 116 based on values provided by a gamma ray detector 102 in accordance with some embodiments. In the illustrative example of FIG. 2, each channel in the x-axis represents a unit measurement of energy, for example 2 keV, and the count rates measured in each channel are plotted on the y-axis.

In embodiments, the gain stabilization device 106 will define two adjacent windows 212, 214 of channels, defined by a low threshold channel 206, a boundary channel 208, and an upper threshold channel 210. Therefore, a first window 212 defined by the low threshold channel 206 and the boundary channel 208 will include a first set of channels comprised of a number of channels, each representing an energy level of detected gamma radiation. Similarly, a second window 214 defined by the boundary channel 208 and the upper threshold channel 210 will include a second set of channels comprised of a number of channels. The windows 212, 214 may include contiguous channels within the respective ranges, although embodiments are not limited thereto. The windows 212, 214 will preferably not overlap, although windows 212, 214 can overlap or partially overlap in some embodiments. The first window 212 can include, for example, 1 to 30 channels, 5 to 25 channels, or 10 to 20 channels, and the second window 214 can include, for example, 1 to 40 channels, 5 to 30 channels, or 10 to 25 channels. As an illustrative example, FIG. 2 shows that the first window 212 can include 8 channels, and the second window 214 can include 19 channels, although embodiments are not limited thereto. The boundary channel 208 can be included in either, both, or neither of the first window 212 and the second window 214.

The gain stabilization device 106 sums the counts in the first window 212 to generate total counts in the first window 212. Separately, the gain stabilization device 106 sums the counts in the second window 214 to generate total counts in the second window 214. The gain stabilization device 106 then generates a ratio of these two totals:

$$\text{Ratio} = \text{total counts in first window}/\text{total counts in second window} \quad (1)$$

The gain stabilization device 106 compares the ratio calculated in Equation (1) to a desired ratio. If the ratio calculated according to Equation (1) is not equal to or is outside a predetermined range of the desired ratio. In some examples, the predetermined range can be within about 10% of a desired ratio between 0.5 and 0.7. In some examples, the predetermined range can include values within, for example, a range of about ±1% of 0.58, and if the gain is outside this predetermined range, the gain stabilization device 106 will adjust the gain to a new value based on, for example, the extent to which the ratio calculated according to Equation (1) differs from the desired ratio.

Figure 3:
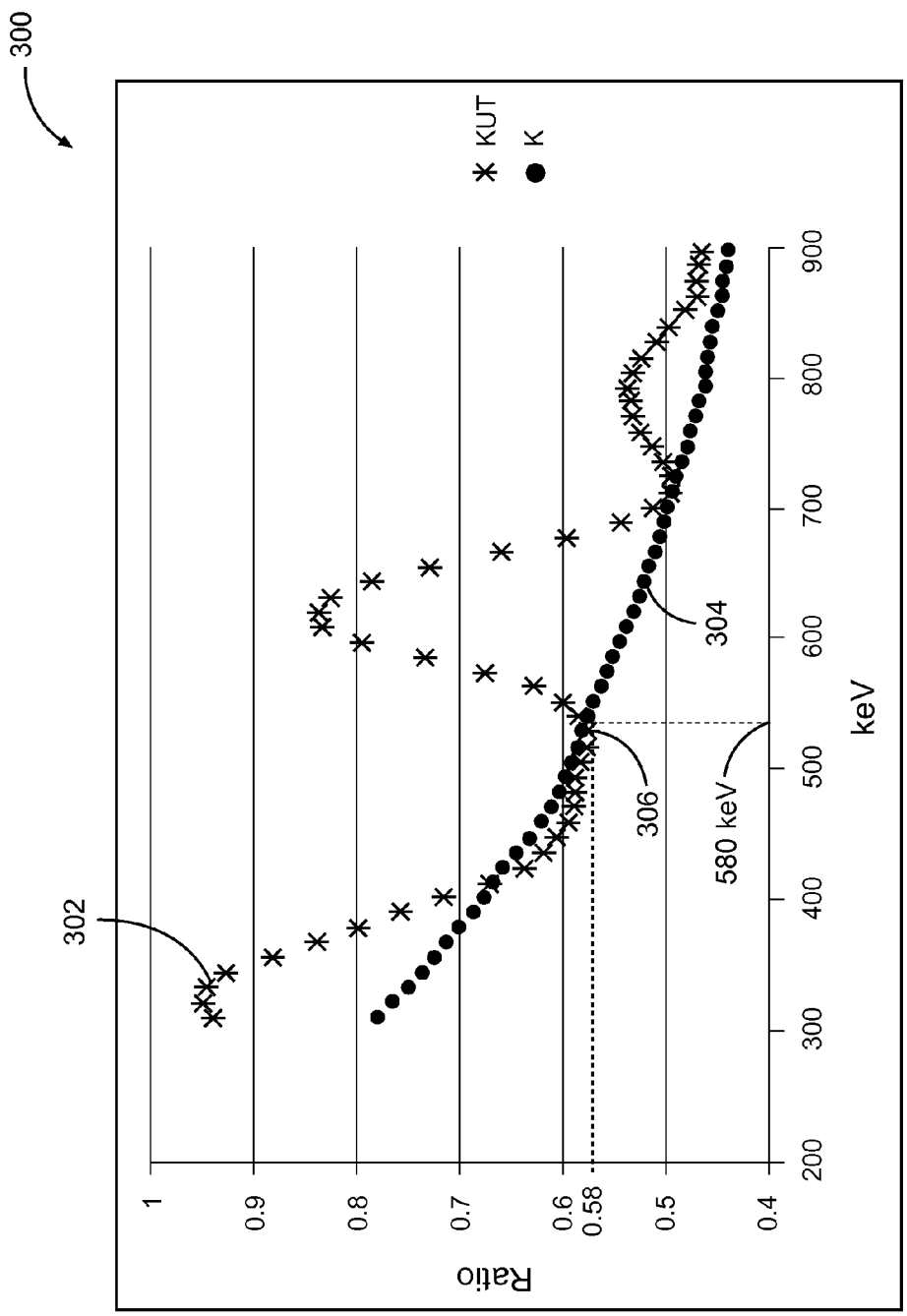
FIG. 3 illustrates the relationship between ratios and low threshold channels for purposes of describing operations for calculating a desired ratio in accordance with some embodiments.

FIG. 3 illustrates the relationship between ratios and low threshold channels for purposes of describing operations for calculating a desired ratio in accordance with some embodiments.

In some embodiments, to generate a value for the desired ratio, the gain stabilization device 106 accesses a test spectrum representative of a subterranean formation environment that includes a combination of at least two of potassium, uranium or thorium. Additionally, the gain stabilization device 106 accesses a potassium spectrum representative of measurements received from an idealized or hypothetical test formation environment comprised entirely of potassium.

Using data of these two spectra, the gain stabilization device 106 generates curves 302 and 304 that represent the relationship between channels and ratios. The gain stabilization device generates curves 302 and 304 by varying a channel number of the low threshold channel associated with the test spectrum over a range of channels, with window sizes for the first window 212 (FIG. 2) and the second window 214 (FIG. 2) set to a predetermined value. The gain stabilization device 106 calculates the ratio according to Equation (1) for each channel number. The gain stabilization device 106 then generates curve 302 defining a relationship between the low threshold energy level (x-axis in FIG. 3) and the ratio (y-axis in FIG. 3).

The gain stabilization device 106 similarly varies a channel number of a low threshold channel associated with a potassium spectrum over a range of channel numbers, to generate a second curve 304 defining a relationship between low threshold channel numbers and total counts in the first window 212 of the potassium spectrum to total counts in the second window 214 of the potassium spectrum. As described earlier herein, the potassium spectrum is an example spectrum for a formation environment, including the formation and fluid in the borehole, consisting essentially of potassium. As will be understood by those of ordinary skill in the art, this type of formation environment is useful as a reference, but may not occur commonly in the field.

The gain stabilization device 106 will use the ratio value for a point 306, which is one of two or more points where curves 302 and 304 meet, for the desired ratio. In the illustrative example of FIG. 3, the gain stabilization device 106 will choose a ratio of 0.58, based on the intersection point 306 as the desired ratio because this ratio represents a count value that will be present in any gamma spectrum. For example, the ratio represents count values generated based on gamma radiation of a subterranean formation comprised of any percentage of potassium, uranium and thorium, including the hypothetical potassium-only subterranean formation discussed earlier herein.

In some embodiments, the gain stabilization device 106 can adjust the number of channels include in the windows (e.g., "window sizes"), thereby adjusting the shape of the curves 302, 304 and the points at which curve 302 and 304 will meet, until the points at which the curves 302, 304 meet fall within a desired range, or until the gain stabilization device 106 determines that a curve shape criterion for the curves 302, 304 is met. For example, the gain stabilization device 106 may vary the window sizes to vary counts in the windows, and, by extension, the ratios of these counts, until the curves meet in no more than a certain number of points, for example, two to three points, or until the curves meet at one or more points within a range, e.g., 500-800 keV.

Using window sizes calculated according to these criteria will enhance sensitivity of the gamma ray detector 102. From inspection of FIG. 3, for example, it will be noted that a small change in window size would change the ratio very quickly. Further, the gain stabilization device 106 or other processor or surface system can calculate or determine any other significant points, e.g. peaks, of spectra based on the stabilized channel number of the low threshold, because the energy and channel number have a linear relationship, and therefore once the spectrum is stabilized the energy value of the other peaks can be determined.

In some examples, the gain stabilization device 106 may provide larger gain adjustments upon powering up the gamma ray measurement tool 100 than would have been provided after the gamma ray measurement tool 100 has been operating for longer periods of time. The gain stabilization device 106 may perform gain adjustment after the spectra contain a minimum amount of counts. Alternatively, or in addition, the gain stabilization device 106 may implement algorithms to determine gain adjustment periodically, or after a minimum period of time has passed with the accumulated counts in the gamma ray detector 102 exceeding a minimum number of counts. The intervals between gain adjustments may vary as the magnitudes of the counts stored in the spectra vary. The time between adjustments should be sufficiently long so that the gain stabilization device 106 can make a statistically significant adjustment, yet short enough so that the gamma ray detector 102 can respond to gain variations.

Figure 4:
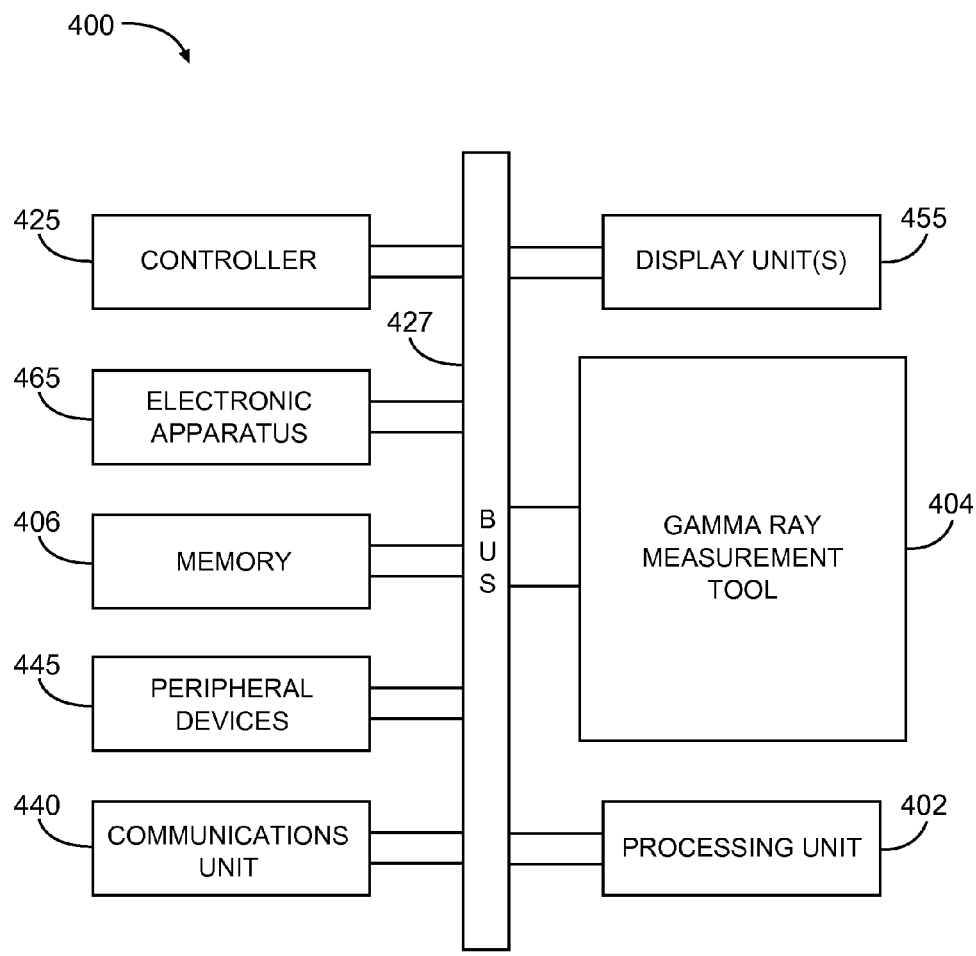
FIG. 4 depicts a block diagram of a logging system according to some embodiments.

FIG. 4 depicts a block diagram of a logging system 400 according to various embodiments. The logging system 400 can receive count measurements or other data from the gamma ray measurement tool 100 (FIG. 1) and provide gain stabilization for one or more gamma ray detectors 102 of the gamma ray measurement tool 100. The logging system 400 includes gamma ray measurement tool 404 operable in a wellbore.

The processing unit 402 can perform functionalities of the gain stabilization device 106 (FIG. 1) in addition to other control functionalities, etc. The processing unit 402 can couple to the gamma ray measurement tool 404 to obtain measurements from the gamma ray measurement tool 404 as described earlier herein regarding FIG. 1. In some embodiments, a logging system 400 comprises one or more of the gamma ray measurement tool 404, as well as a housing (not shown in FIG. 4) that can house the gamma ray measurement tool 404 or other electronics. The housing might take the form of a wireline tool body, or a downhole tool as described in more detail below with reference to FIGS. 6 and 7. The processing unit 402 may be part of a surface workstation or the processing unit 402 can be packaged with the gamma ray measurement tool 404 as described earlier herein regarding FIG. 1 or attached to the housing.

The logging system 400 can additionally include a controller 425, an electronic apparatus 465, and a communications unit 440. The controller 425 and the processing unit 402 can be fabricated to operate the gamma ray measurement tool 404 to acquire measurement data such as counts as the gamma ray measurement tool 404 is operated.

Electronic apparatus 465 can be used in conjunction with the controller 425 to perform tasks associated with taking measurements downhole with the gamma ray measurement tool 404. The communications unit 440 can include downhole communications in a drilling operation. Such downhole communications can include a telemetry system.

The logging system 400 can also include a bus 427, where the bus 427 provides electrical signal paths among the components of the logging system 400. The bus 427 can include an address bus, a data bus, and a control bus, each independently configured. The bus 427 can also use common conductive lines for providing one or more of address, data, or control, the use of which can be regulated by the controller 425. The bus 427 can include instrumentality for a communication network. The bus 427 can be configured such that the components of the logging system 400 are distributed. Such distribution can be arranged between downhole components such as the gamma ray measurement tool 404 and components that can be disposed on the surface of a well. Alternatively, several of these components can be co-located such as on one or more collars of a drill string or on a wireline structure.

In various embodiments, the logging system 400 includes peripheral devices that can include displays 455, additional storage memory, or other control devices that may operate in conjunction with the controller 425 or the processing unit 402. The display 455 can display diagnostic information for the gamma ray measurement tool 404 based on the signals generated according to embodiments described above.

In an embodiment, the controller 425 can be fabricated or arranged as one or more processors. The display 455 can be fabricated or programmed to operate with instructions stored in the processing unit 402 (for example in the memory 406) to implement a user interface to manage the operation of the gamma ray measurement tool 404 or components distributed within the logging system 400. Such a user interface can be operated in conjunction with the communications unit 440 and the bus 427. Various components of the logging system 400 can be integrated with the gamma ray measurement tool 404 or associated housing such that processing identical to or similar to the processing schemes discussed with respect to various embodiments herein can be performed downhole.

In various embodiments, a non-transitory machine-readable storage device can comprise instructions stored thereon, which, when performed by a machine, cause the machine to perform operations, the operations comprising one or more features similar to or identical to features of methods and techniques described herein, for example the instructions can cause the machine to perform gain stabilization operations of the gain stabilization device 106, signal processing of the signal processing circuitry 104, etc. A machine-readable storage device, herein, is a physical device that stores data represented by physical structure within the device. Examples of machine-readable storage devices can include, but are not limited to, memory 406 in the form of read only memory (ROM), random access memory (RAM), a magnetic disk storage device, an optical storage device, a flash memory, and other electronic, magnetic, or optical memory devices, including combinations thereof. Example embodiments are also intended to cover computers programmed to perform the acts of the above-described methods or (field) programmable logic arrays ((F)PLAs) or (field) programmable gate arrays ((F)PGAs), programmed to perform the acts of the above-described methods.

The physical structure of such instructions may be operated on by one or more processors such as, for example, the processing unit 402. Executing these physical structures can cause the machine to perform operations according to methods described herein. The instructions can include instructions to cause the processing unit 402 to store associated data or other data in the memory 406. The memory 406 can store the results of measurements of formation parameters or parameters of the gamma ray measurement tool 100 such as gain parameters, calibration constants, identification data, etc. The memory 406 can store a log of the gamma radiation detected by the gamma ray detector. The memory 406 therefore may include a database, for example a relational database.

Figure 5:
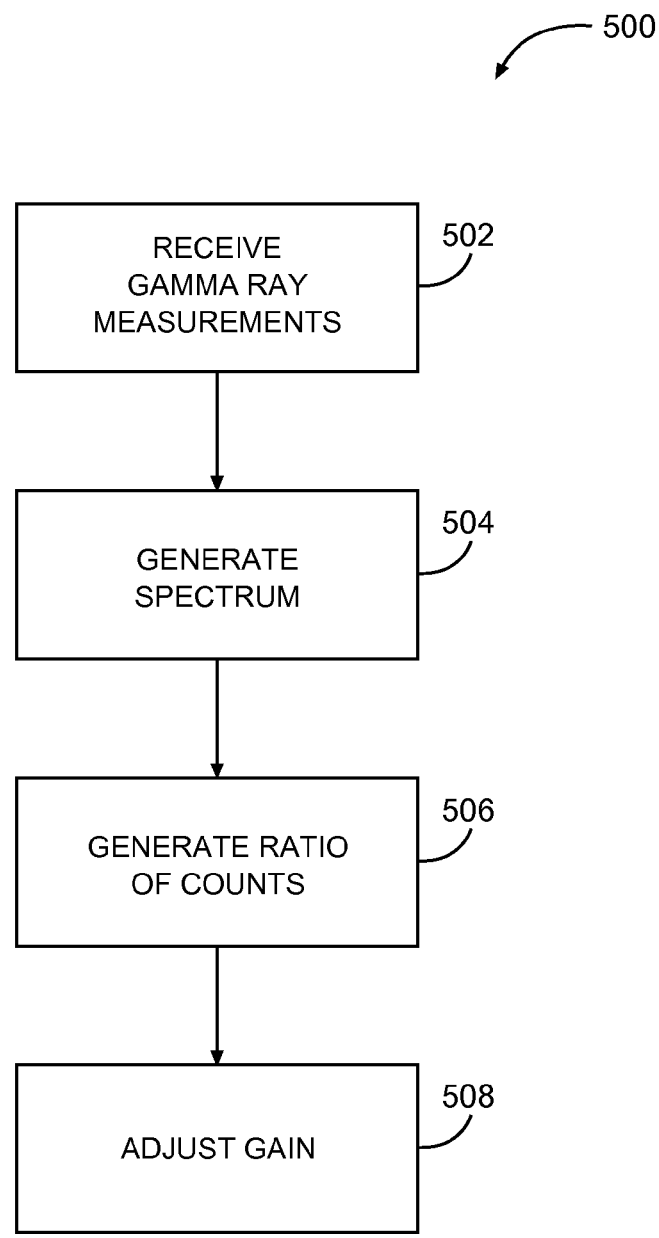
FIG. 5 is a flowchart illustrating a method for adjusting gain of a gamma ray detector.

FIG. 5 is a flowchart illustrating a method 500 for adjusting gain of a gamma ray detector 102. The example method 500 is described herein with reference to hardware circuitry, spectra, windows, etc. shown in FIGS. 1-4. Some operations of example method 500 can be performed in whole or in part by a gain stabilization device 106 (FIG. 1), or any component of system 400 (FIG. 4) or gamma ray measurement tool 100 (FIG. 1), although embodiments are not limited thereto.

The example method 500 begins with operation 502 in which the gain stabilization device 106 receives gamma ray measurements from a gamma ray detector 102.

The example method 500 continues with operation 504 in which the gain stabilization device 106 generates a spectrum based on the gamma ray measurements. The spectrum 202 can be similar to spectrum 202 described earlier herein with reference to FIGS. 2 and 3. The spectrum 202 can include several channels with corresponding count rates, wherein a channel number of a channel corresponds to energy values of the received gamma rays.

The example method 500 continues with operation 506 in which the gain stabilization device 106 generates a ratio of total counts in a first window 212 of the spectrum to total counts in a second window 214 of the spectrum. As described earlier herein with reference to FIGS. 2 and 3, the first window 212 includes a first set of channels starting at a low threshold channel and the second window 214 includes a second set of channels. The gain stabilization device 106 can generate the ratio as described earlier herein with reference to Equation (1).

The example method 500 continues with operation 508 in which the gain stabilization device 106 adjusts a gain of at least one gamma ray detector 102 responsive to a determination that the ratio generated in operation 506 is different from a desired ratio. As described earlier herein with reference to FIG. 3, the gain stabilization device 106 can determine the desired ratio by accessing a test spectrum representative of a subterranean formation that includes a combination of at least two of potassium, uranium or thorium, and a potassium spectrum representative of a formation that includes only potassium. The gain stabilization device 106 will vary a channel number of a low threshold channel associated with the test spectrum over a range of channel numbers, to generate a first curve 302 (FIG. 3) defining a relationship between channel numbers and a ratio of first window 212 total counts to second window 214 total counts associated with the test spectrum. Similarly, the gain stabilization device 106 will varying a channel number of a low threshold channel associated with the potassium spectrum over a range of channel numbers, to generate a second curve 304 (FIG. 3) defining a relationship between channel numbers and a ratio of first window 212 total counts to second window 214 total counts associated with the potassium spectrum. As further described earlier herein, the gain stabilization device 106 will select a ratio as the desired ratio based on a point 306 at which the first curve 302 and the second curve 304 intersect.

Figure 6:
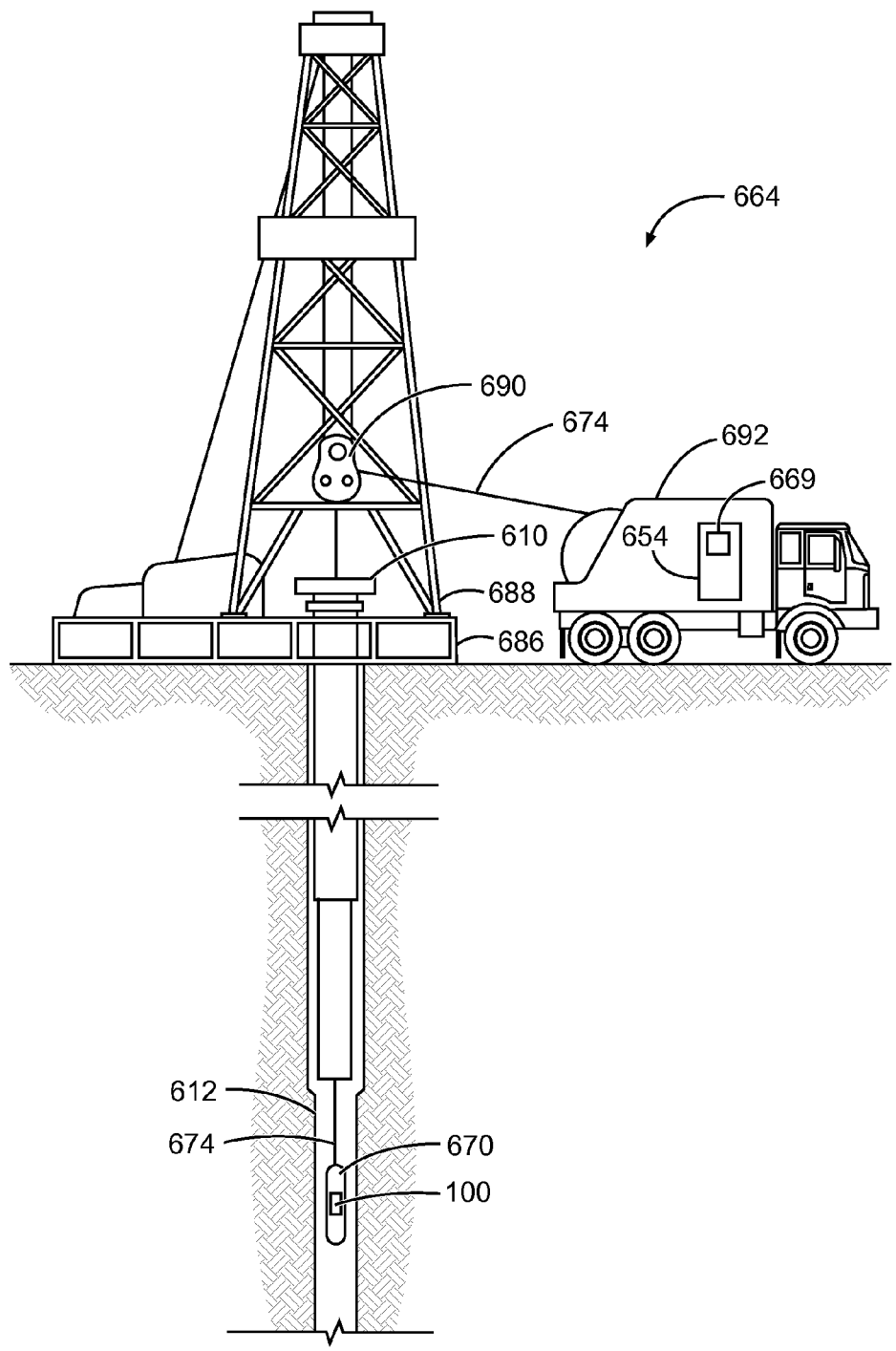
FIG. 6 depicts an example wireline system, where the system is operable to control a gamma ray measurement tool to conduct measurements in a wellbore.
Figure 7:
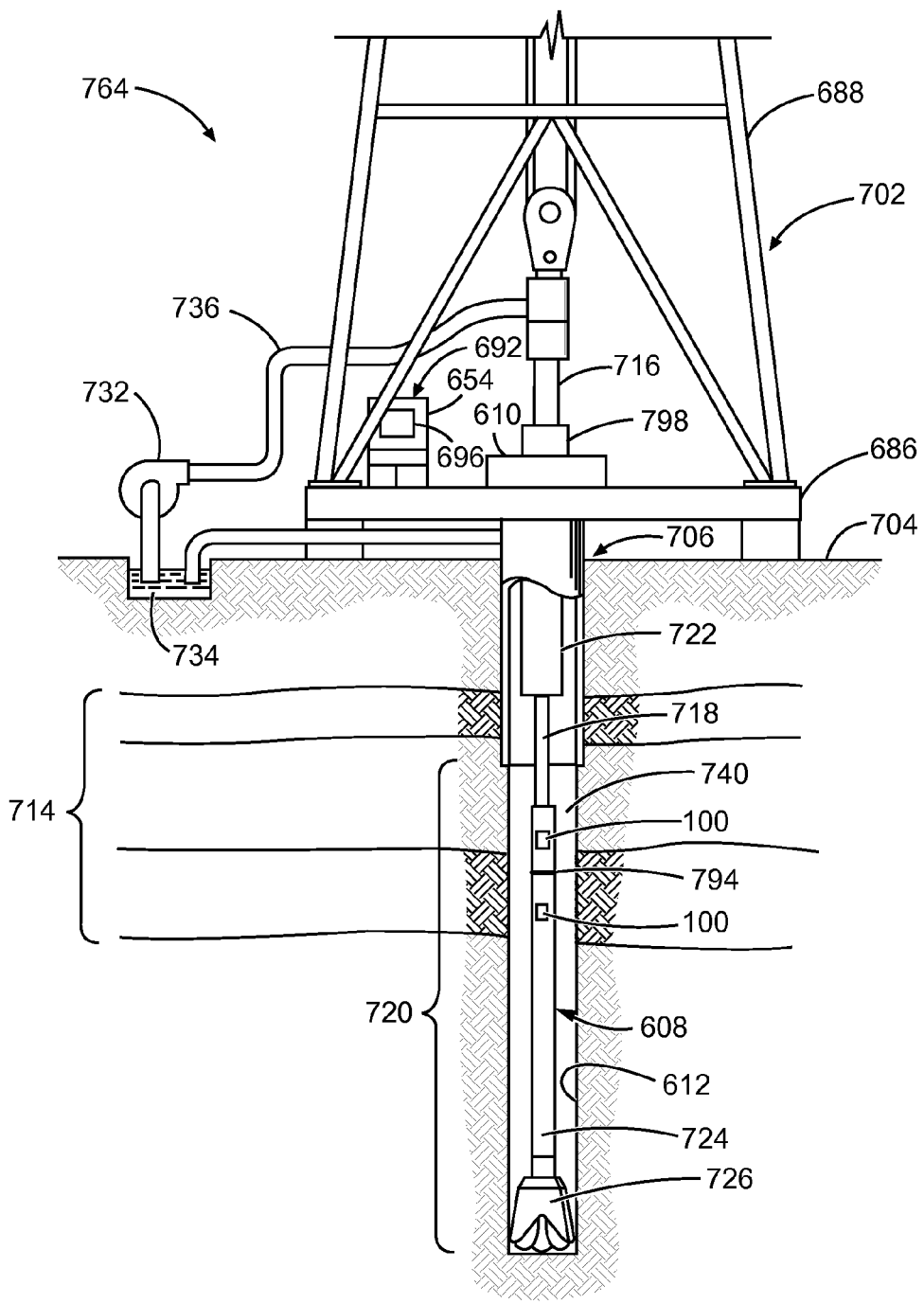
FIG. 7 depicts an example drilling rig system, where the system is operable to control a gamma ray measurement tool to conduct measurements in a wellbore.

As described earlier herein, gamma ray measurement tools can be used in a logging-while-drilling (LWD) assembly or a wireline logging tool. FIG. 6 depicts an example wireline system, where the system is operable to control a gamma ray measurement tool 100 to conduct measurements in a wellbore. FIG. 7 depicts an example drilling rig system, where the system is operable to control a gamma ray measurement tool 100 to conduct measurements in a wellbore. Thus, the systems 664, 764 may comprise portions of a wireline logging tool body 670 as part of a wireline logging operation, or of a downhole tool 724 as part of a downhole drilling operation. Thus, FIG. 6 shows a well during wireline logging operations. In this case, a drilling platform 686 is equipped with a derrick 688 that supports a hoist 690.

Drilling oil and gas wells is commonly carried out using a string of drill pipes connected together so as to form a drilling string that is lowered through a rotary table 610 into a wellbore or borehole 612. Here it is assumed that the drilling string has been temporarily removed from the borehole 612 to allow a wireline logging tool body 670, such as a probe or sonde, to be lowered by wireline or logging cable 674 into the borehole 612. Typically, the wireline logging tool body 670 is lowered to the bottom of the region of interest and subsequently pulled upward at a substantially constant speed.

During the upward trip, at a series of depths the instruments (e.g., the gamma ray measurement tool 100 shown in FIG. 1) included in the tool body 670 may be used to perform measurements on the subsurface geological formations adjacent the borehole 612 (and the tool body 670). The measurement data can be communicated to a surface logging facility 692 for storage, processing, and analysis. The logging facility 692 may be provided with electronic equipment for various types of signal processing, which may be implemented by any one or more of the components of the gamma ray measurement tool 100. Similar formation evaluation data may be gathered and analyzed during drilling operations (e.g., during LWD operations, and by extension, sampling while drilling).

In some embodiments, the tool body 670 comprises a gamma ray measurement tool 100 for obtaining and analyzing gamma ray field measurements in a subterranean formation through a borehole 612. The tool is suspended in the wellbore by a wireline cable 674 that connects the tool to a surface control unit (e.g., comprising a workstation 654, which can also include a display). The tool may be deployed in the borehole 612 on coiled tubing, jointed drill pipe, hard wired drill pipe, or any other suitable deployment technique.

Turning now to FIG. 7, it can be seen how a system 764 may also form a portion of a drilling rig 702 located at the surface 704 of a well 706. The drilling rig 702 may provide support for a drill string 708. The drill string 708 may operate to penetrate the rotary table 610 for drilling the borehole 612 through the subsurface formations 714. The drill string 708 may include a Kelly 716, drill pipe 718, and a bottom hole assembly 720, perhaps located at the lower portion of the drill pipe 718.

The bottom hole assembly 720 may include drill collars 722, a downhole tool 724, and a drill bit 726. The drill bit 726 may operate to create the borehole 612 by penetrating the surface 704 and the subsurface formations 714. The downhole tool 724 may comprise any of a number of different types of tools including MWD tools, LWD tools, and others.

During drilling operations, the drill string 708 (perhaps including the Kelly 716, the drill pipe 718, and the bottom hole assembly 720) may be rotated by the rotary table 610. Although not shown, in addition to, or alternatively, the bottom hole assembly 720 may also be rotated by a motor (e.g., a mud motor) that is located downhole. The drill collars 722 may be used to add weight to the drill bit 726. The drill collars 722 may also operate to stiffen the bottom hole assembly 720, allowing the bottom hole assembly 720 to transfer the added weight to the drill bit 726, and in turn, to assist the drill bit 726 in penetrating the surface 704 and subsurface formations 714.

During drilling operations, a mud pump 732 may pump drilling fluid (sometimes known by those of ordinary skill in the art as "drilling mud") from a mud pit 734 through a hose 736 into the drill pipe 718 and down to the drill bit 726. The drilling fluid can flow out from the drill bit 726 and be returned to the surface 704 through an annular area 740 between the drill pipe 718 and the sides of the borehole 612. The drilling fluid may then be returned to the mud pit 734, where such fluid is filtered. In some embodiments, the drilling fluid can be used to cool the drill bit 726, as well as to provide lubrication for the drill bit 726 during drilling operations. Additionally, the drilling fluid may be used to remove subsurface formation cuttings created by operating the drill bit 726.

Thus, it may be seen that in some embodiments, the systems 664, 764 may include a drill collar 722, a downhole tool 724, and/or a wireline logging tool body 670 to house one or more gamma ray measurement tools 100, similar to or identical to the gamma ray measurement tool 100 described above and illustrated in FIG. 1. Components of the system 400 in FIG. 4 may also be housed by the tool 724 or the tool body 670.

Thus, for the purposes of this document, the term "housing" may include any one or more of a drill collar 722, a downhole tool 724, or a wireline logging tool body 670 (all having an outer wall, to enclose or attach to magnetometers, sensors, fluid sampling devices, pressure measurement devices, transmitters, receivers, acquisition and processing logic, and data acquisition systems). The tool 724 may comprise a downhole tool, such as an LWD tool or MWD tool. The wireline tool body 670 may comprise a wireline logging tool, including a probe or sonde, for example, coupled to a logging cable 674. Many embodiments may thus be realized.

Thus, a system 664, 764 may comprise a downhole tool body, such as a wireline logging tool body 670 or a downhole tool 724 (e.g., an LWD or MWD tool body), and one or more gamma ray measurement tools 100 attached to the tool body, the gamma ray measurement tool 100 to be constructed and operated as described previously.

Any of the above components, for example the gamma ray measurement tools 100, gain stabilization device 106, etc., may all be characterized as "modules" herein. Such modules may include hardware circuitry, and/or a processor and/or memory circuits, software program modules and objects, and/or firmware, and combinations thereof, as desired by the architect of the gamma ray measurement tool 100 and systems 400, 664, 764 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of gamma ray measurement tool 100 and systems 400, 664, 764 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Some embodiments include a number of methods.

It should be noted that the methods described herein do not have to be executed in the order described, or in any particular order. Moreover, various activities described with respect to the methods identified herein can be executed in iterative, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

In summary, using the apparatus, systems, and methods disclosed herein may provide increased stability in the gain of gamma ray measurement tools in the presence of electronics drift, temperature extremes, or other environmental or design factors relative to conventional mechanisms. These advantages can significantly enhance the value of the services provided by an operation/exploration company, while at the same time controlling time-related costs.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Although specific embodiments have been illustrated and described herein, it will be appreciated by those of ordinary skill in the art that any arrangement that is calculated to achieve the same purpose may be substituted for the specific embodiments shown. Various embodiments use permutations or combinations of embodiments described herein. It is to be understood that the above description is intended to be illustrative, and not restrictive, and that the phraseology or terminology employed herein is for the purpose of description. Combinations of the above embodiments and other embodiments will be apparent to those of ordinary skill in the art upon studying the above description.

What is claimed is:

1. A method comprising:
   receiving gamma ray measurements from a gamma ray detector;
   generating a spectrum based on the gamma ray measurements, the spectrum including a plurality of channels and count rates for the plurality of channels, wherein a channel number of a channel corresponds to energy values associated with the gamma ray measurements;
   generating a ratio of total counts in a first window of the spectrum to total counts in a second window of the spectrum, the first window including a first set of channels with a low threshold channel and the second window including a second set of channels; and
   adjusting a gain of the gamma ray detector responsive to determining that the ratio is different from a desired ratio.

2. The method of claim 1, further comprising:
   determining the desired ratio by
   accessing a test spectrum representative of a subterranean formation that includes a combination of at least two of potassium, uranium or thorium;
   accessing a potassium spectrum representative of a formation that consists essentially of potassium;
   selecting a first window size and a second window size;
   varying a channel number of a low threshold channel associated with the test spectrum over a range of channel numbers, to generate a first curve defining a relationship between the channel number of the low threshold channel associated with the test spectrum and a ratio of first window total counts to second window total counts associated with the test spectrum, the first window total counts being based on the first window size and the channel number of the low threshold channel associated with the test spectrum and the second window total counts being based on the second window size;
   varying a channel number of a low threshold channel associated with the potassium spectrum over a range of channel numbers to generate a second curve defining a relationship between the channel number of the low threshold channel associated with the potassium spectrum and a ratio of first window total counts to second window total counts associated with the potassium spectrum, the first window total counts being based on the first window size and the channel number of the low threshold channel associated with the potassium spectrum and the second window total counts being based on the second window size; and
   selecting a ratio as the desired ratio based on a point at which the first curve and the second curve intersect.

3. The method of claim 2, wherein the range of channel numbers is selected based on electrical parameters of the gamma ray detector.

4. The method of claim 3, wherein the range of channel numbers corresponds to energy values of 200 keV to 900 keV.

5. The method of claim 1, further comprising:
   selecting a size for each of the first window and the second window by
   accessing a test spectrum representative of a formation that includes a combination of at least two of potassium, uranium or thorium;
   accessing a potassium spectrum representative of a formation that consists essentially of potassium;
   selecting a first value for the number of channels to be used for the first window and the second window;
   varying a channel number of a low threshold channel associated with the test spectrum over a range of channel numbers to generate a first curve defining a relationship between channel numbers and a ratio of first window total counts to second window total counts associated with the test spectrum;
   varying a channel number of a low threshold channel associated with the potassium spectrum over a range of channel numbers to generate a second curve defining a relationship between channel numbers and a ratio of first window total counts to second window total counts associated with the potassium spectrum;
   adapting the first value for the number of channels to be used for the first window and the second window, responsive to determining whether and at how many points the first curve and the second curve intersect, to generate a second value for the number of channels to be used for the first window and the second window; and repeating the generating the first curve, generating the second curve, and the adapting until a curve shape criterion is met.

6. The method of claim 5, wherein the curve shape criterion includes a determination that the first curve and the second curve meet in no more than two points.

7. The method of claim 1, further comprising:
repeating the receiving, generating the spectrum, generating the ratio and the adjusting periodically to provide operational stabilization of the gamma ray detector.

8. The method of claim 1, further comprising:
logging the gamma ray measurements as part of a down hole logging operation.

9. The method of claim 1, wherein adjusting the gain includes adjusting one of a detector supply voltage and an amplifier gain associated with the gamma ray detector.

10. The method of claim 1, wherein the first set of channels does not overlap with the second set of channels.

11. The method of claim 10, wherein the first set of channels includes between 5 and 10 contiguous channels and the second set of channels includes between 15 and 20 contiguous channels, and wherein the desired ratio is within a threshold range of 0.58.

12. An apparatus comprising:
a gamma ray detector to receive a detector supply voltage, the gamma ray detector to detect gamma radiation as detected gamma radiation;
signal processing circuitry coupled to the gamma ray detector, the signal processing circuitry including a pulse height analyzer to generate a spectrum based on the gamma ray measurements, the spectrum including a plurality of channels and count rates for the plurality of channels, wherein a channel number of a channel corresponds to energy values of the received gamma ray measurements; and
a gain stabilization device to
generate a ratio of total counts in a first window of the spectrum to total counts in a second window of the spectrum, the first window including a first set of channels starting at a low threshold channel and the second window including a second set of channels, and
adjust a gain of the gamma ray detector if the ratio is outside a threshold range of a desired ratio.

13. The apparatus of claim 12, further comprising:
a high voltage power supply to supply the detector supply voltage.

14. The apparatus of claim 12, wherein the gamma ray detector includes a scintillation crystal to scintillate responsive to radiation emitted by a subterranean formation, and a photodetector for transmitting light emitted by the scintillator crystal, and wherein the gamma ray detector does not include a reference scintillation crystal.

15. The apparatus of claim 14, wherein the gamma ray detector includes an amplifier to amplify electrical impulses output by the photodetector.

16. The apparatus of claim 15, wherein the gain stabilization device is coupled to one or more of the high voltage power supply and the amplifier to adjust the gain of the gamma ray detector.

17. A system comprising:
a gamma radiation detection apparatus including
a gamma ray detector to receive a detector supply voltage, the gamma ray detector to detect gamma radiation as detected gamma radiation;
signal processing circuitry coupled to the gamma ray detector, the signal processing circuitry including a pulse height analyzer to generate a spectrum based on the gamma ray measurements, the spectrum including a plurality of channels and count rates for the plurality of channels, wherein a channel number of a channel corresponds to energy values of the received gamma ray measurements; and
a gain stabilization device to
generate a ratio of total counts in a first window of the spectrum to total counts in a second window of the spectrum, the first window including a first set of channels starting at a low threshold channel and the second window including a second set of channels, and
adjust a gain of the gamma ray detector if the ratio is outside a
threshold range of a desired ratio; and
a down hole tool housing coupled to the gamma radiation detection apparatus.

18. The system of claim 17, further comprising a display unit to display the spectrum.

19. The system of claim 17, wherein the down hole tool housing includes one of a wireline tool housing or a housing coupled to a drill string.

20. The system of claim 17, further comprising a memory coupled to the gamma ray detector, wherein the memory is used to store a log of the gamma radiation detected by the gamma ray detector.

* * * * *